(12) United States Patent
Reichelt

(10) Patent No.: US 8,472,103 B2
(45) Date of Patent: Jun. 25, 2013

(54) COMPLEX-VALUED SPATIAL LIGHT MODULATOR

(75) Inventor: Stephan Reichelt, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 369 days.

(21) Appl. No.: 12/738,660

(22) PCT Filed: Oct. 13, 2008

(86) PCT No.: PCT/EP2008/063727
§ 371 (c)(1),
(2), (4) Date: Apr. 19, 2010

(87) PCT Pub. No.: WO2009/053267
PCT Pub. Date: Apr. 30, 2009

(65) Prior Publication Data
US 2010/0253995 A1     Oct. 7, 2010

(30) Foreign Application Priority Data

Oct. 19, 2007   (DE) .......................... 10 2007 051 520

(51) Int. Cl.
*G02B 26/00* (2006.01)
(52) U.S. Cl.
USPC ......................................... 359/290; 359/291
(58) Field of Classification Search
USPC ................................................ 359/290, 291
See application file for complete search history.

(56) References Cited

U.S. PATENT DOCUMENTS

| 3,890,035 | A | 6/1975 | Takeda |
| 7,227,687 | B1 | 6/2007 | Trisnadi et al. |
| 2002/0105725 | A1 * | 8/2002 | Sweatt et al. ................. 359/566 |
| 2004/0179268 | A1 | 9/2004 | Barbastathis et al. |

FOREIGN PATENT DOCUMENTS

| EP | 0 477 566 A2 | 4/1992 |
| WO | WO 2004/059365 A1 | 7/2004 |

OTHER PUBLICATIONS

International Search Report, dated Jan. 29, 2009, and Written Opinion issued in priority International Application No. PCT/EP2008/063727.
Tormen et al., "Deformable MEMS grating for wide tunability and high operation speed," Journal of Optics. A Pure and Applied Optics, vol. 8, No. 7, pp. S337-S340 (Jul. 1, 2006).
Takahashi et al., "A sutdy on optical diffraction characteristics of skewed MEMS pitch tunable gratings," Optical MEMS and Nanophotonics, 2007 IEEE?LEOS Intl. Converence on IEEE, PI, pp. 176-176 (Aug. 1, 2007).
Yu-Sheng Yang and Cheng-Hsien Liu, "Design and fabrication of pitch tunable blaze grating," Proceedings of the SPIE, vol. 5717, pp. 99-107 (Jan. 1, 2005).
Sene et al., "Development and characterization of micro-mechanical gratings for optical modulation," Micro Electromechanical Systems, MEMS '96 Proceedings, An Investigation of Micro Structures, Sensors, Actuators, Machines and Systems, IEEE, pp. 222-227 (Feb. 11, 1996).
Zhou et al., "Nondispersive optical phase shifter array using microelectromechanical systems based gratings," Optics Express 20070820 Optical Society of America US, vol. 15, No. 17, pp. 10958-10963 (Aug. 20, 2007).
Yu-Chun Chang and James burge, "Error analysis for CGH optical testing," SPIE vol. 3782, pp. 358-366 (Jul. 1999).

* cited by examiner

*Primary Examiner* — James Jones
(74) *Attorney, Agent, or Firm* — Saul Ewing LLP

(57) ABSTRACT

In a pixilated spatial light modulator having a mesh-based modulator element per pixel, a real location-dependent amplitude and a location-dependent phase can be adjusted independently of each other for modulating a coherent wavefront using complex values. A complex-valued spatial light modulator includes a regularly constructed pixel array, wherein each pixel comprises a controllable reflective line mesh. The modulation of the amplitude and phase take place independently of each other in each modulator element, by relative motions of the self-supporting line mesh relative to a base plate. The line meshes are suspended and supported such that both the distance between the base plate and the line mesh (normal adjustment for amplitude modulation) and the lateral displacement of the line mesh in the mesh plane itself (phase modulation) are modified by a system controller. The reflected light is thus modulated independently of each other.

19 Claims, 10 Drawing Sheets

(a)                                         (b)

COMPLEX-VALUED SPATIAL LIGHT MODULATOR

CROSS REFERENCE TO RELATED APPLICATIONS

This application claims the priority of PCT/EP2008/063727, filed on Oct. 13, 2008, which claims priority to German Application No. 10 2007 051 520.2, filed Oct. 19, 2007, the entire contents of which are hereby incorporated in total by reference.

BACKGROUND OF THE INVENTION

The present invention relates to a spatial light modulator with regularly arranged pixels, where each pixel comprises a modulator element in the form of a controllable line grating for a complex modulation of a wave front, and to a method for realising this complex modulation.

Spatial light modulator devices comprise at least one spatial light modulator (SLM) which is provided based on micro-electro-mechanical systems (MEMS) in this invention. Various designs of MEMS-type SLM systems are known in the prior art under various names. Known embodiments are mirror arrays such as digital mirror devices (DMD), deformable mirrors (DM), piston micro mirror arrays, and diffraction-grating-based systems such as grating light valves (GLV), spatial optical modulators (SOM) or grating electro-mechanical systems (GEMS). Spatial light modulators are employed in a wide range of applications which are based on optical technologies and where variable or adaptive optical elements are preferably used.

The fields of application of spatial light modulators include display and projection systems for the consumer goods sector, microscopy (optical tweezers, phase filter, digital holographic microscopy, in-vivo imaging), beam and wave front forming using dynamic diffractive elements (laser material processing, measuring equipment, focus control), optical measuring equipment (digital holography, fringe projection, Shack-Hartmann sensor), and applications in maskless lithography, ultra-fast laser pulse modulation (dispersion compensation) or in terrestrial telescopes (dynamic aberration correction).

The pixels in the MEMS-based SLM systems are diffraction-grating-based modulator elements which employ the principle of the controllable diffraction efficiency in the reflected orders of phase gratings, where typically the $\pm 1^{st}$ orders are used for reasons of efficiency. The diffraction efficiency $\eta$ of a diffractive element is generally defined as the quotient of the intensity of the exiting wave front and the intensity of the incident wave front. In a phase grating, the diffraction is realised by a phase shift which can be controlled either binary or continuously. Binary control requires a pulsed operation in order to adjust the desired greyscale value in the amplitude by way of pulse-width modulation. Embodiments of diffraction-grating-based MEMS-type SLM are known in which either the entire line gratings or individual elements of the gratings are moved vertically to achieve the modulation. Known diffraction-grating-based systems have in common that an amplitude modulation of the diffracted wave field is desired. The phase of the diffracted wave field cannot be modulated deliberately because it does not behave independent of the amplitude modulation on the one hand, and because it only varies slightly on the other.

In contrast, piston micro mirror arrays which deliberately only modulate the phase of the reflected wave field can be used as spatial light modulators. The phase is modulated in that adjacent pixels are given a mutual height offset, which causes a relative phase shift of the reflected wave field.

In many applications, an amplitude-only modulation, a phase-only modulation or the interrelated amplitude and phase modulation of a wave field as described above is sufficient. However, there are a number of applications where a complex modulation of a wave front is essential. A complex modulation means to set complex values with a real part and an imaginary part, i.e. here with amplitude and phase. Applications in which such a complex modulation is essential include holographic display systems, applications in optical information processing and data storage, and maskless lithography. The requirement of a complex modulation is reflected in the various documents which are concerned with these applications.

For example, encoding methods have been developed which also allow a complex amplitude of a wave field to be stored in phase-only or amplitude-only holograms. These methods, however, are at the cost of efficiency, resolution or phase reconstruction quality.

Documents EP 0 477 566 B1 and U.S. Pat. No. 7,227,687 B1 describe how a complex value is rendered in one pixel by way of combining multiple phase-shifting sub-pixels to get a large pixel, and how complex spatial light modulators can be made that way. Further, patent document U.S. Pat. No. 3,890,035 discloses combinations of multiple SLM, where the modulation of amplitude and phase is realised by two SLM which are arranged one after another.

It can be noted that in the most various fields of technology spatial light modulators are required to have the following characteristics: large number and small size of pixels (i.e. a large space bandwidth product), high modulation speed, great dynamic range, high diffraction efficiency, analogue or digital control with great accuracy and reproducibility, great fill factor, usability in various spectral ranges of the light and at various spectral densities.

It is known from the theory of diffraction-grating-based systems that both the diffraction efficiency (amplitude squared) and, to a minor degree, the phase will be affected if the relative distance between the grating and a basis is changed when modulating wave fields in reflection-type grating-based spatial light modulators. However, these two quantities are interrelated, i.e. cannot be controlled independently of each other. In order to be able to control the phase of the reflected wave fronts independently of the relative displacement of the grating normal to the modulator surface, a further degree of freedom of the movement of the gratings is necessary. It is known from interferometric measuring technology that a displacement of a line grating effects a phase shift in the diffraction orders m≠0. If a line grating is moved parallel to its grating vector and at right angles to the incident wave front, the phase of the wave which is diffracted in the $m^{th}$ order is shifted by m·2π times the number of grating periods p which move through a fixed reference point.

Theoretical background information which is relevant to understand the spatial light modulator according to this invention will be given in some detail at the end of the Description.

SUMMARY OF THE INVENTION

It is the object of the present invention to modulate both spatially and temporally the complex amplitude of a wave field which is incident on a pixelated light modulator in each pixel. The two components of the complex amplitude, namely the position-specific real amplitude and the position-specific phase, shall be controllable independently of one another in each pixel and preferably over the entire respective range of values (real amplitude: $0 \leq A \leq 1$ and phase: $0 \leq \varphi \leq 2\pi$). Such spatial light modulator shall realise an improved diffraction efficiency, resolution and/or phase reconstruction quality.

The object is solved by the characterising features of claims 1 and 20. Preferred embodiments of the invention are defined in the dependent claims.

The functional principle of the spatial light modulator (SLM) according to this invention is based on the laws of scalar diffraction theory, in particular as applied to line gratings. The SLM comprises a multitude of pixels which are arranged in a one- or two-dimensional array, and it is illuminated by a wave field. Each pixel of the SLM comprises a modulation element in the form of a controllable reflecting line grating with a grating period p, where according to this invention the position of said line grating is controlled by a system controller such that it can be moved in two directions independently of one another. In particular, the position of the line grating can be changed both normal to the plane of the light modulator and lateral in a plane that is parallel to the plane of the light modulator but at right angles to the structure of the line grating independently of one another in order to effect a phase and amplitude modulation of the incident wave field. Through these position changes the phase modulation which is interrelated with the amplitude modulation of the incident wave field is given an additional phase value which brings about a resultant phase distribution.

Generally, the line grating of a pixel comprises multiple ribbons or one ribbon, which can have multiple elements. According to this invention, the elements of the grating are suspended in a self-supporting manner over a base plate which is situated in the light modulator plane or in a plane which is parallel to the latter. In a first embodiment of the present invention, the elements of the grating can be arranged with a certain distance between neighbouring elements. In a second embodiment, the line grating comprises multiple elements which are disposed closely side by side. In both embodiments, the elements of the gratings are movably supported so that they can move from an initial position in a direction at right angles to the structure of the line grating. It is possible that individual elements of the grating are moved or that all elements of the grating in a pixel are moved together. The multitude of pixels is controlled by electrical signals of a system controller such that the amplitude and phase of the wave fronts which hit the modulation elements are modulated independently of one another in each pixel.

Control signals which are provided by the system controller cause a multitude of actuator elements to change the position of the line gratings relative to the base plate through movable connection means which connect the actuator elements and line gratings. The changes in the position of the line gratings relative to the base plate which are caused by the actuator elements preferably cover the entire range of the amplitude and phase values between individual pixels. The effect of the actuator elements is preferably based on the principle of electrostatics, electromagnetism, or on the piezoelectric effect.

A further characteristic of the present invention is that the resultant amplitude and phase distribution which is generated in the light modulator plane can be binary, n-stage binary or serrated for a switching state of the light modulator.

The invention further relates to a spatial light modulator device with a complex light modulator according to this invention whose pixels are operated optionally in an amplitude modulation mode, in a phase modulation mode or in a complex modulation mode, and with at least one light source, an optical imaging system and a filtering unit. Undesired diffraction orders are blanked out by the filtering unit. Only one diffraction order of the modulated wave field is preferably used in the grating-based SLM.

The object of the invention is further solved by a method for modulating a wave field which hits a spatial light modulator with regularly arranged pixels, where each pixel comprises a reflecting modulation element in the form of a controllable line grating with a grating period p. In this method, a system controller controls a change in the position of the line grating both normal to the plane of the light modulator and lateral in a plane that is parallel to the plane of the light modulator but at right angles to the structure of the line grating independently of one another, whereby a phase modulation of the incident wave field which is interrelated with a desired amplitude modulation is given an additional phase value.

The process steps of the change in the position of the line grating are carried out independently of each other laterally in a plane that is parallel to the plane of the light modulator but at right angles to the structure of the line grating to effect a phase change of the reflected wave front and normal to the plane of the light modulator to effect an amplitude change of the wave front.

According to the present invention, the value of the additional phase modulation is either determined in a model calculation which is executed by a computing unit which is integrated into the system controller. Another possibility of determining the additional phase value takes advantage of a calibration measurement whose values are stored in a storage medium and which are retrieved by a computing unit. In another embodiment of the method, the system controller realises a staged phase profile by moving ribbons in the normal direction in that N ribbons per grating period p are moved relative to each other offset at a distance $\Delta t/N$ in a line grating.

The SLM can also be controlled such that different grating periods are realised in individual pixels of the array. Different exit angles of the diffracted wave field are thereby achieved. For example, the SLM can be divided into different pixel regions, each of which reconstructing a different wave field. This makes it possible to realise a space division multiplexing of different wave fields at the same time with the SLM according to this invention.

BRIEF DESCRIPTION OF THE DRAWINGS

Now, the complex spatial light modulator according to this invention will be described in detail in conjunction with the accompanying drawings, wherein.

DETAILED DESCRIPTION

The embodiments below relate to a light modulator (SLM) according to this invention, of which only one pixel will be described in detail to represent the entire panel. For reasons of clarity, details of diffractive or grating-based SLMs which are widely known and/or which are irrelevant for the present invention will be omitted in the following description. In order to be able to take advantage of the characteristics of a grating-based spatial light modulator, the amplitude and phase distribution in the plane of the light modulator can be realised in the form of a binary, N-stage binary or serrated distribution. The grating is illuminated with a coherent wave front preferably in the normal direction, where the incident wave has an amplitude and a phase.

Figure 1:
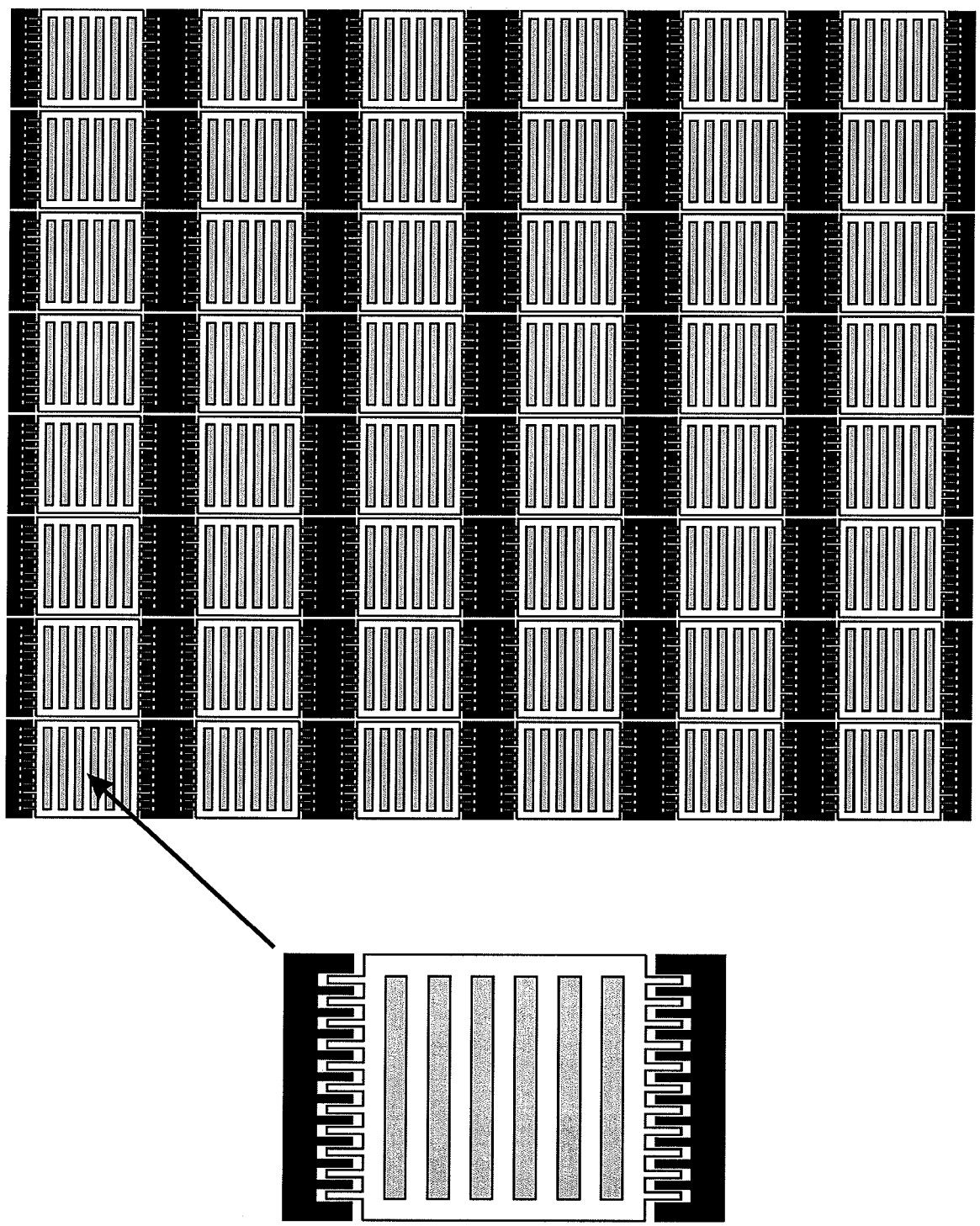
FIG. 1 shows a complex light modulator according to this invention with a number of pixels in a 2D arrangement, and an enlarged detail that shows a single pixel, FIGS. 2*a, b* are perspective views of two embodiments which illustrate the functional design of a grating-based pixel of the complex light modulator according to this invention, FIGS. 3*a, b, c* are side views which show an embodiment of a pixel according to FIG. 2*a* in three different switching states, FIGS. 4*a, b, c* are side views which show a further embodiment of a pixel according to FIG. 2*b* in three different switching states, FIGS. 5*a, b, c* are side views which show a further embodiment of a pixel in three different switching states, FIGS. 6*a, b, c* are side views which show a further embodiment of a pixel in three different switching states.

The complex SLM according to this invention comprises an array with a multitude of regularly arranged reflecting pixels. The array of pixels can be a one-dimensional or a two-dimensional array. FIG. 1 is a top view that shows a two-dimensional pixel array of said SLM. The arrow points at an enlarged grating-based pixel as a detail. The drawing of the single pixel shows that actuator elements (not specified) can be in lateral contact with a movable connection means. The connection means can e.g. be a frame with comb-like lateral sections which is movably connected with elements or ribbons of a line grating. The lateral dimension of a pixel typically ranges between several micrometers and few hundred micrometers.

Figure 2A:
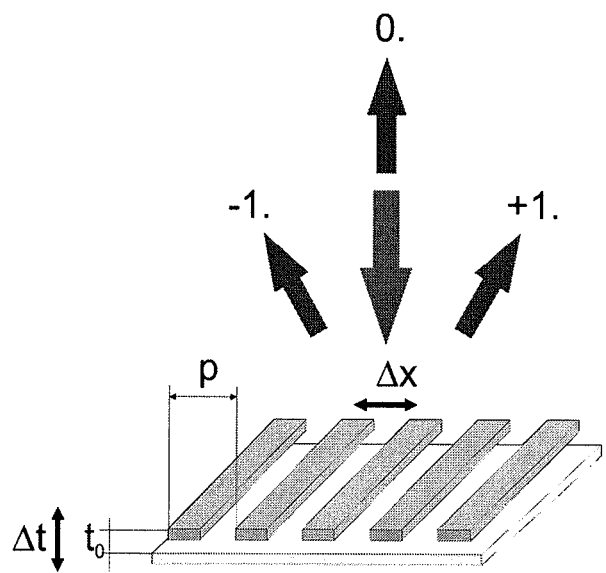
Figure 2B:
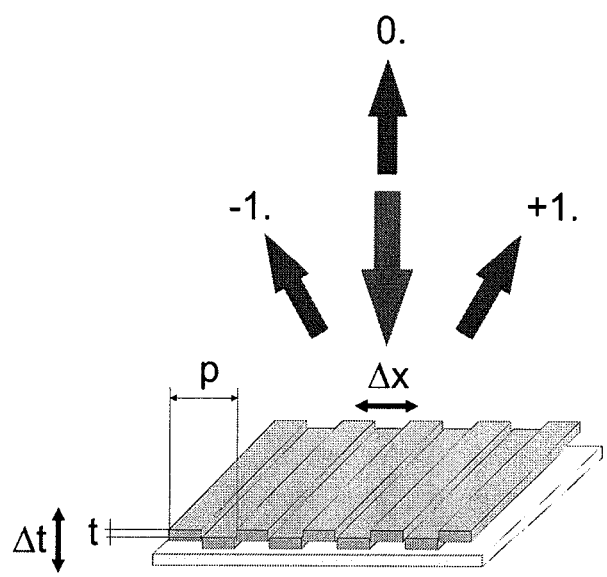

FIGS. 2a and 2b are perspective views which illustrate two embodiments of a pixel according to this invention. Each pixel comprises a modulation element in the form of a coplanar line grating which can be controlled through a system controller (not shown). The line grating in FIG. 2a comprises movable elements or ribbons which are arranged in parallel and which are separated laterally by grooves. The ribbons are situated at a distance which corresponds with one grating period p of the line grating. They are suspended in a self-supporting manner at a distance $t_0$ over a base plate, where $t_0$ specifies the initial position for the movement to be carried out. Each pixel of the light modulator can be given a separate base plate. In further embodiments of the present invention, a base plate can alternatively serve as a common base element for all pixels. The lateral displacement parallel to the plane of the base plate and at the same time parallel to the grating vector of the line gratings which must be achieved for the modulation of the incident wave fields is specified with Δx, the displacement normal to the plane of the base plate is specified with Δt. Both displacement directions are indicated by double arrows in the drawing.

These two displacement directions will hereinafter be referred to briefly as 'lateral displacement' and 'normal displacement', or just 'lateral' and 'normal'. Further, an arrow that points at the line grating indicates the direction of incidence of the coherent wave fields which are to be modulated, and arrows that point away from the line grating indicate the directions of the $0^{th}$ and of the selected $\pm 1^{st}$ diffraction orders of the reflected modulated wave fields. The ribbons are either made of or coated with a reflecting material. In the individual embodiments, the base plate is also either made of or coated with a reflecting material, or made of or coated with an absorbing material.

The ribbons are connected at the upper and lower edge of the pixel by a connection means (not shown), e.g. a movable frame. One or multiple controllable actuators can be attached to the frame which effect the lateral (in-plane) displacements of the line gratings. In addition, further controllable actuators can be attached to that frame which effect the normal (piston-like, out-of-plane) displacements of the line gratings. The latter movements are stroke movements. The actuators are generally controlled by control signals provided by the system controller (not shown).

The controlled movements of the ribbons can be effected by actuators which work for example according to the principles of electrostatics, electromagnetism or to the piezoelectric effect. A lateral movement can for example be realised electrostatically with the help of a comb-drive actuator, which can support and move multiple ribbons at the same time. A stroke movement can also be realised electrostatically, e.g. with the help of bimorph-flexure-type or bimorph-cantilever-type actuators. In order to be able to set any possible amplitude and phase values independently of one another in the complex light modulator, a minimum normal displacement of Δt=λ/4 of the desired wavelength and a minimum lateral displacement of Δx=p of the ribbons is required. Because of the reflection of the wave fronts by the base plate in the grooves of the grating, the geometrical distance is passed twice, so that an effective phase difference φ at a distance t of λ/4 corresponds with the value π. The maximum diffraction efficiency η is reached in phase gratings, or here of the ribbons, at this phase difference φ. The first embodiment of a complex light modulator (C-SLM), which is shown in FIG. 2a, can preferably be used if the initial distance $t_0$ of the ribbons is a multiple of λ/4. Due to a certain minimum thickness of the elements of the grating, and because of given geometrical and technological boundary conditions, this is likely to be the favoured type of C-SLM. This C-SLM permits the modulator elements which are arranged in the pixels to be independently controlled laterally and normally in a small range, thus independently modulating the amplitude and phase of incident wave fields.

Referring to FIG. 2b, in a second embodiment the line grating of a pixel is made up of elements which are disposed next to each other with very small gaps in between.

These elements have the form of ribbons and are suspended in a self-supporting manner over a base plate, where e.g. every other ribbon can be displaced normally. The individual ribbons are disposed so close to each other that they can just be displaced normally without affecting each other. In this embodiment, the base plate preferably has an absorbing property for light of a given wavelength in order to actually suppress the effects of the light which passes through those very small gaps between the ribbons. The ribbons are of a reflecting type again. The second embodiment of a light modulator is preferably used where the C-SLM is to be operated in a low order of the effective phase difference φ, i.e. if the distance between the ribbons and the base plate is to be e.g. between 0 and λ/4. According to another control option of the second embodiment, multiple ribbons which lie side by side can be moved together normally in order to realise either different effective grating periods p or different effective duty factors of the line gratings of a pixel.

Figure 3A:
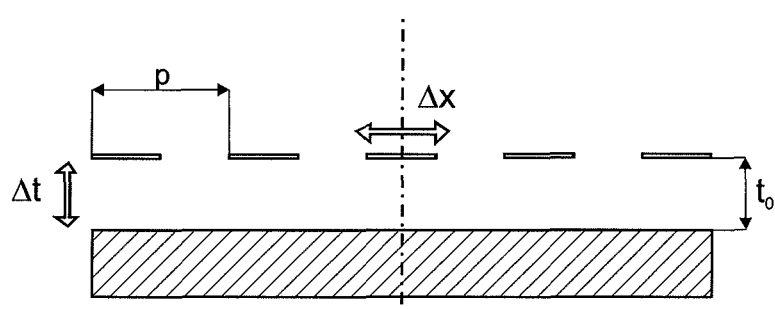
Figure 3B:
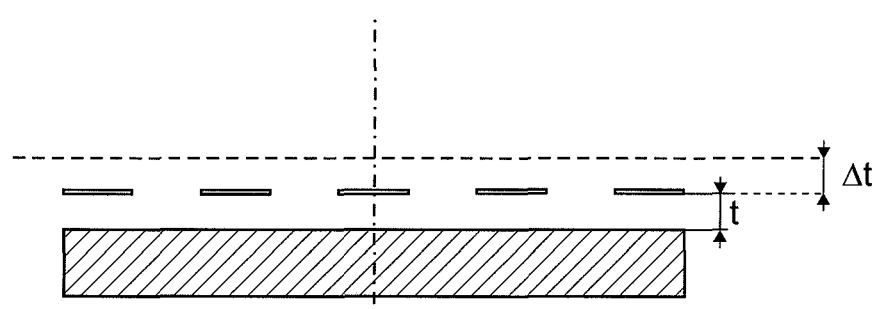
Figure 3C:
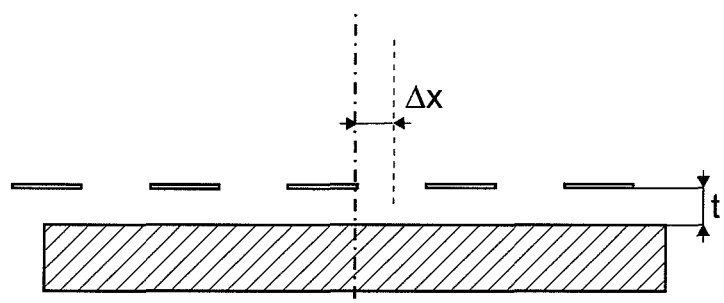

FIGS. 3a to 3c are side views which show an embodiment of a pixel according to FIG. 2a in three different switching states. Individual elements of the grating, which are separated by grooves between two adjacent elements, are arranged in parallel over a base plate and have a grating period p. Both the base plate and the elements of the grating are of a reflecting type.

FIG. 3a shows a pixel of the C-SLM in its initial state. Depending on the initial distance $t_0$ between the self-supporting elements of the grating and the base plate, this can be a deactivated (off) switching state—dark pixel at t=nλ/4—or an activated (on) switching state—bright pixel at t=(n+1)λ/4—with n=0, 2, 4, . . . . The lateral and normal displacement directions Δx and Δt are indicated by double arrows.

In FIG. 3b, the elements of the grating of the pixel have been moved by the displacement Δt towards the base plate. The initial state with the initial distance $t_0$ is indicated by a broken line. The switching state which corresponds with this movement is also realised with the help of prior-art SLM, and it allows the diffraction efficiency η to be manipulated systematically. This normal displacement of the elements of the grating also causes a small phase shift, as already described above. The latter effects a marginal phase modulation which is interrelated with the amplitude modulation of the incident wave fronts. The position-specific phase value can be set for each pixel by an additional lateral displacement Δx of the elements of the grating independently of the already effected normal displacement Δt. This is shown in FIG. 3c. All elements of the grating are laterally displaced together, which can e.g. be effected by comb-drive actuator elements, which are controlled by corresponding control signals provided by the system controller.

Figure 4A:
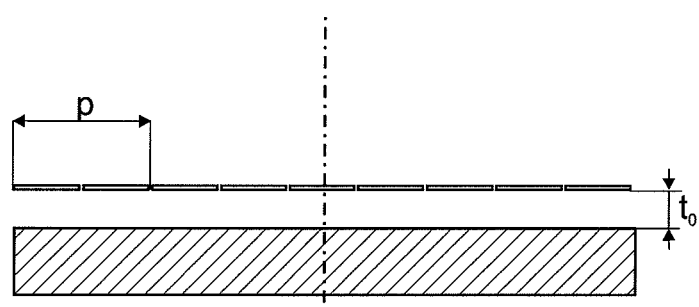
Figure 4B:
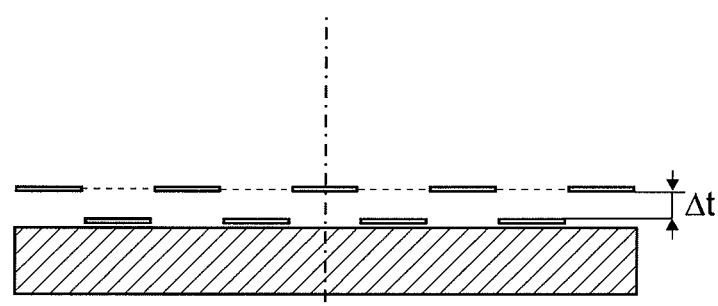
Figure 4C:
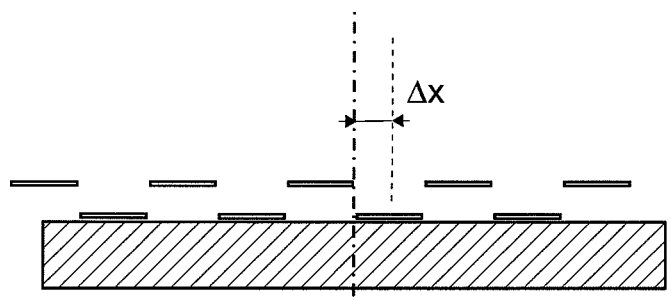

FIGS. 4a to 4c are side views which show a pixel according to the second embodiment, shown in FIG. 2b, in three different switching states. Referring to FIG. 4a, reflecting elements of the grating are arranged in parallel and closely side by side over a base plate, providing an effective grating period p. At an initial distance $t_0$, the elements of the grating which are supported in a self-supporting manner have the effect of an ordinary mirror surface. The elements of the grating are provided in the form of ribbons here. Referring to the switching state shown in FIG. 4b, every other ribbon has been activated by controlled actuators (not shown) and displaced by the displacement Δt in the normal direction compared to the initial distance $t_0$. Every other ribbon is thus now situated in a plane which is parallel to the base plate and thus parallel to the plane of the light modulator.

Referring to FIG. 4c, the ribbons are additionally moved laterally in their respective planes but at right angles to the structure of the line grating by the displacement Δx. Thanks to these position changes of every other ribbon—both in the lateral and normal direction—a diffractive pixel is realised which modulates both the amplitude and phase of incident wave fronts independently of one another. The displacement Δt in each pixel defines how the diffracted intensities are distributed to the individual diffraction orders. In another embodiment, multiple ribbons which lie side by side can be moved together normally in order to realise either different effective grating periods p or different effective duty factors of the line gratings in a pixel. This causes either different given diffraction angles or different resultant diffraction efficiencies, which can preferably be used for modulation.

Figure 5A:
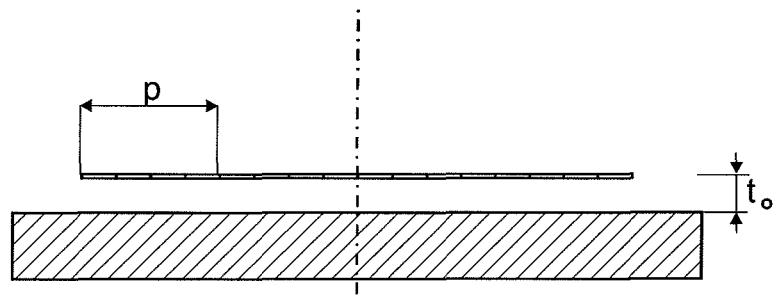
Figure 5B:
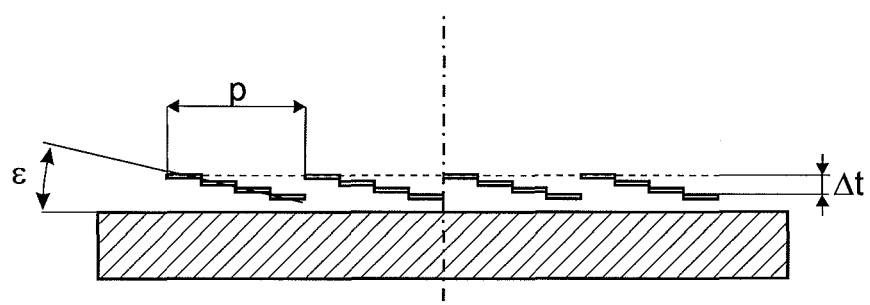
Figure 5C:
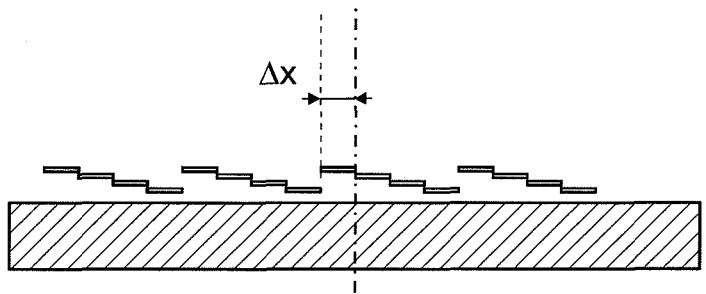

FIGS. 5a to 5c are side views which show a pixel according to a third embodiment in three different switching states. Referring to FIG. 5a, reflecting ribbons are arranged in parallel and closely side by side over a base plate, providing an effective grating period p. The base plate again preferably has an absorbing property for the light of a given wavelength, while the ribbons are of a reflecting type again. A grating period p comprises N adjacent ribbons. At an initial distance $t_0$, the ribbons which are supported in a self-supporting manner have the effect of an ordinary mirror surface. The ribbons are of a very narrow design here. Controllable actuators (not shown) provide for independent control of each ribbon according to desired the switching state.

Referring to FIG. 5b, all ribbons except the first one in each period have been moved in the normal direction. They lie in planes which are parallel to each other and parallel to the base plate. They have been moved in the normal direction such that 4 different phase stages are realised by the N=4 ribbons within a grating period p. At the diffraction efficiency η to be achieved, the distance between the most and the least elevated ribbon corresponds with the displacement Δt. The individual ribbons of a grating period p are preferably be moved in the normal direction such that they exhibit a mutual distance of Δt/N. This way, a staged phase profile is realised and the diffraction efficiency per pixel is increased. A maximum diffraction efficiency η will be achieved if the displacement Δt is chosen such that a blaze angle γ is approximated. The blaze angle is determined by the requirement $\gamma=-\alpha_m/2$. It is further dependent on the used wavelength λ and on the diffraction order m. These types of gratings are known as N-stage binary gratings. The desired amplitude value per diffraction order is set by an angle ∈ which is determined by the displacement Δt and the grating period p, which corresponds with the blaze angle γ for a maximum diffraction efficiency.

Referring to FIG. 5c, the ribbons are additionally moved laterally in their respective planes by the displacement Δx. Alternatively, the lateral displacement can be effected such that instead of the common displacement of all ribbons by Δx the height of the ribbons is individually changed such that the phase shift takes place from one grating period p to the next one at an adjacent ribbon. The N-stage binary line grating thus moves laterally over the base plate. In this case, the discretisation in the lateral direction is N=4, the discretisation step width is p/N. With this third embodiment it is not only possible to approximate the preferred blazed or serrated phase profiles by the individual stages, but any other phase profiles can be approximated too. Another example for this is a cosine-shaped phase profile.

Figure 6A:
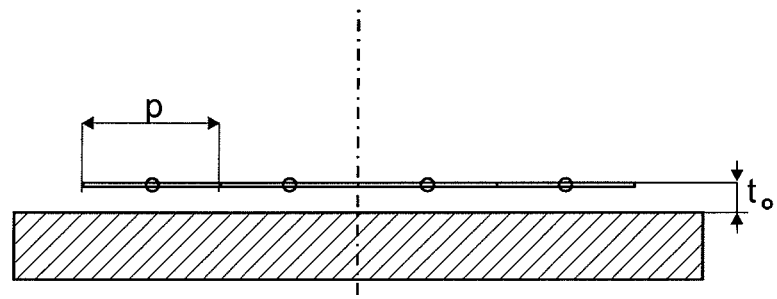
Figure 6B:
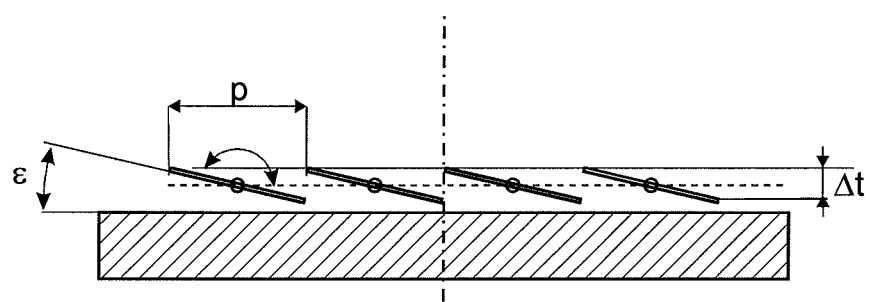
Figure 6C:
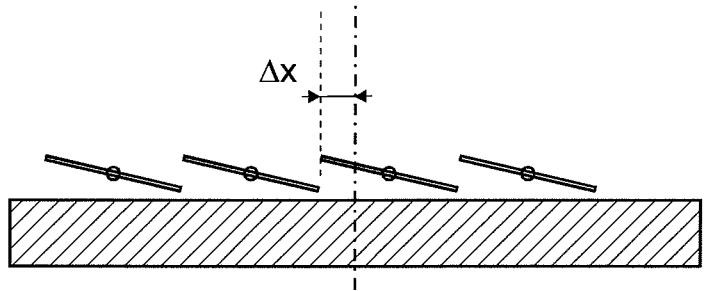

FIGS. 6a to 6c are side views which show a pixel according to a fourth embodiment in three different switching states. Referring to FIG. 6a, reflecting ribbons are arranged in parallel and closely side by side over a base plate, providing an effective grating period p. The base plate has an absorbing property for the light of a given wavelength, while the ribbons are of a reflecting type again. The phase shift Δt is set through a pivoting movement of the individual ribbons around their axis, as can be seen in FIG. 6b. The maximum diffraction efficiency is achieved if the angle ∈ corresponds with the blaze angle. These types of gratings are known as blazed or serrated gratings. They are characterised by a high diffraction efficiency in the desired diffraction order. Referring to FIG. 6c, the ribbons are additionally moved laterally in their respective planes by the displacement Δx in order to realise the additional phase shift.

Figure 7:
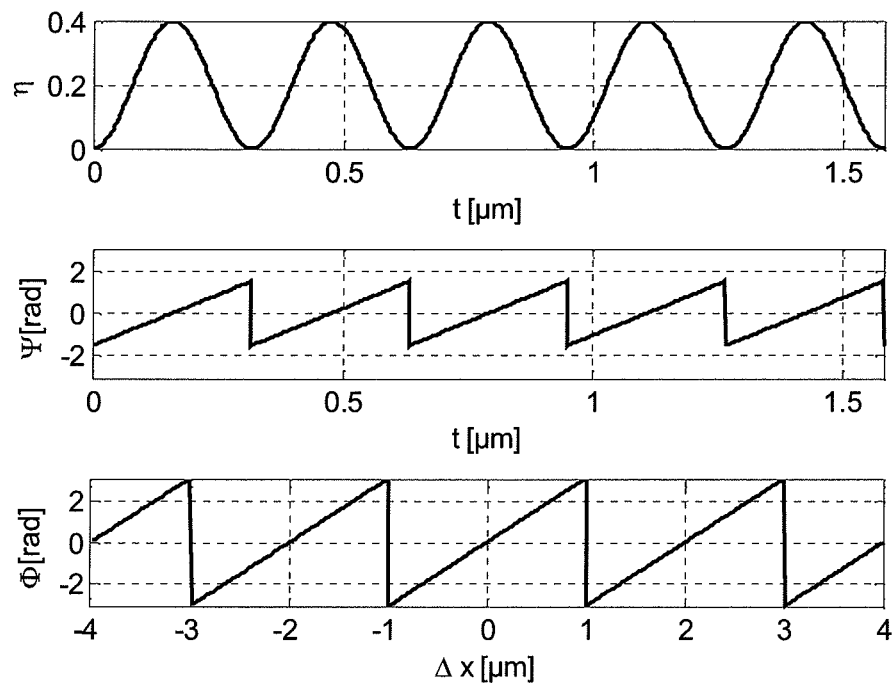
FIG. 7 shows in one-dimensional graphic representations the diffraction efficiency η (which is related to the amplitude) and the resultant phase contributions Ψ and Φ when the line grating is displaced both in the normal and in the lateral direction over multiple periods.

FIG. 7 illustrates the results of a modulation of an incident wave front in one-dimensional graphic representations with the example of an ideal reflecting two-stage binary line grating for a given wavelength λ=633 nm. The top diagram shows the diffraction efficiency η (which is related to the amplitude), and the diagrams below show the phase contributions Ψ and Φ which result from the normal and lateral displacement. The line gratings are here displaced in the normal and lateral direction over multiple periods of the respective displacements. The model calculation is based on an ideal reflecting phase grating ($A_0=A_1=1$) with a grating period p of 2 μm. In the case of metallic or semi-metallic materials, in particular the complex refractive index for the reflecting surfaces of the ribbons and base plate must also be known for the model calculation. The additional phase value, which forms the required or desired position-specific phase value of the complex amplitude together with the phase value that is interrelated with the amplitude modulation, is determined in the model calculation or in a calibration measurement.

Figure 8:
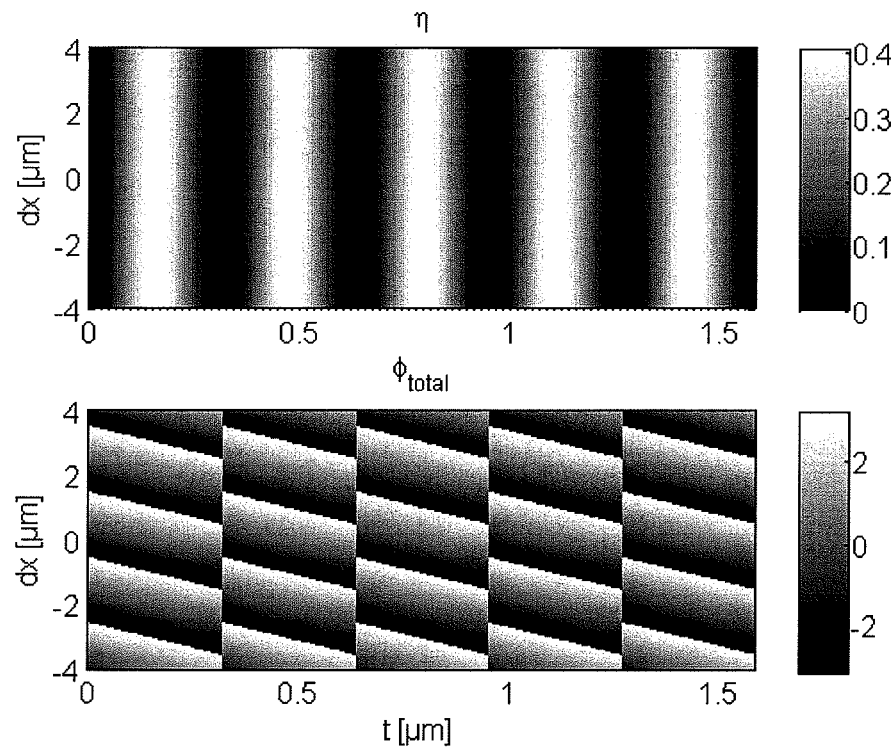
FIG. 8 shows in two-dimensional graphic representations the diffraction efficiency η and the resultant position-specific total phase contribution φ when the line grating is displaced both in the normal and in the lateral direction over multiple periods.

FIG. 8 shows exemplarily in two-dimensional diagrams the diffraction efficiency η, and below the total position-specific phase contribution φ=Ψ+Φ of an ideal reflecting two-stage binary line grating (in the form of a phase grating) which results from normal and lateral displacement, where the displacements Δt and Δx are executed over multiple periods both in the normal and in the lateral direction. The diffraction efficiency η here is a non-normalised, theoretical quantity. The values of the calculation model are the same as those used to produce the diagrams in FIG. 7.

Figure 9:
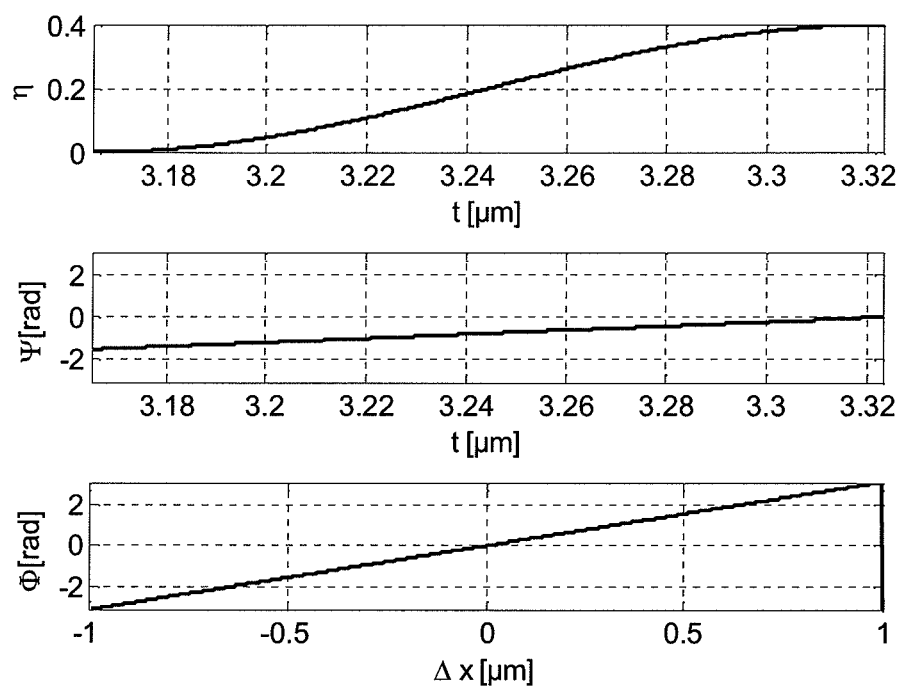
FIG. 9 shows in one-dimensional graphic representations the diffraction efficiency η and the resultant phase contributions Ψ and Φ when the line grating is displaced both in the normal and in the lateral direction over one period.

FIG. 9 illustrates in analogy with FIG. 7 the results of a modulation of an incident wave front in a one-dimensional graphic representation with the example of an ideal reflecting two-stage binary line grating for a given wavelength λ=633 nm. The top diagram shows the diffraction efficiency η (which is related to the amplitude), and the diagrams below show the phase contributions Ψ and Φ which result from the normal and lateral displacement. The displacements of the line gratings in the normal and lateral direction are here only executed over one period. The model calculation is based on an ideal reflecting phase grating ($A_0=A_1=1$) with a grating period p of 2 μm. The values of the calculation model are the same as those used to produce the diagrams in FIG. 7. The normal displacement here covers a range of $(n\lambda/4) \leq t \leq (n+1)\lambda/4$.

Figure 10:
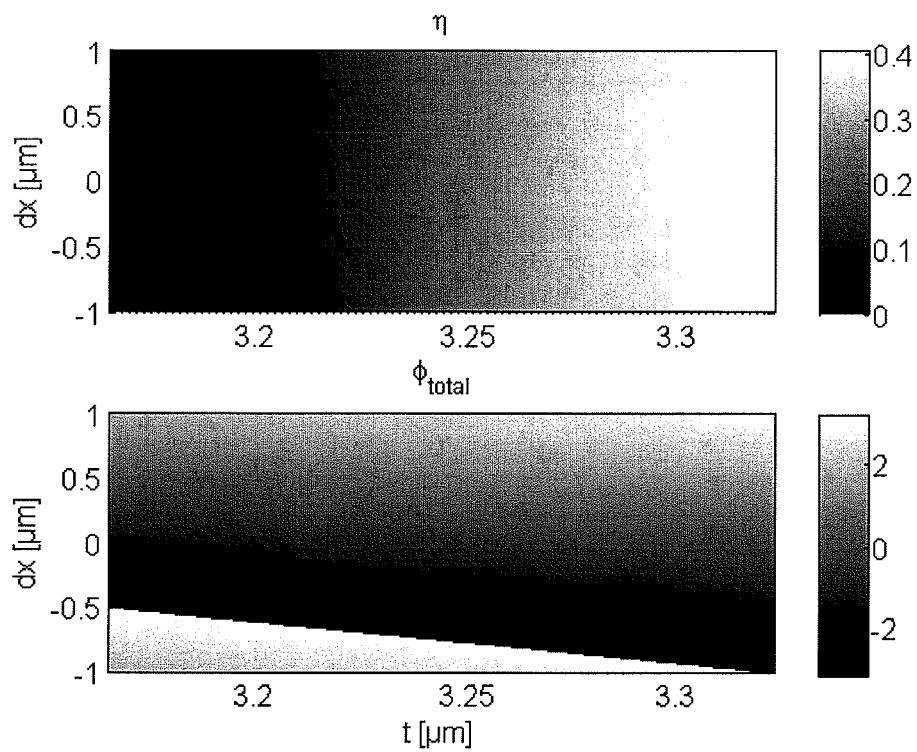
FIG. 10 shows in two-dimensional graphic representations the diffraction efficiency η and the resultant position-specific total phase contribution φ when the line grating is displaced both in the normal and in the lateral direction over multiple periods.

FIG. 10 shows in analogy with FIG. 8 exemplarily in two-dimensional diagrams the diffraction efficiency η, and below the total position-specific phase contribution φ=Ψ+Φ of an ideal reflecting two-stage binary line grating (in the form of a phase grating) which results from normal and lateral displacement. The displacements Δt and Δx in the normal and lateral direction are here only executed over one period. The diffraction efficiency η here is a non-normalised, theoretical quantity. The values of the calculation model are the same as those used to produce the diagrams in FIG. 7.

Figure 11:
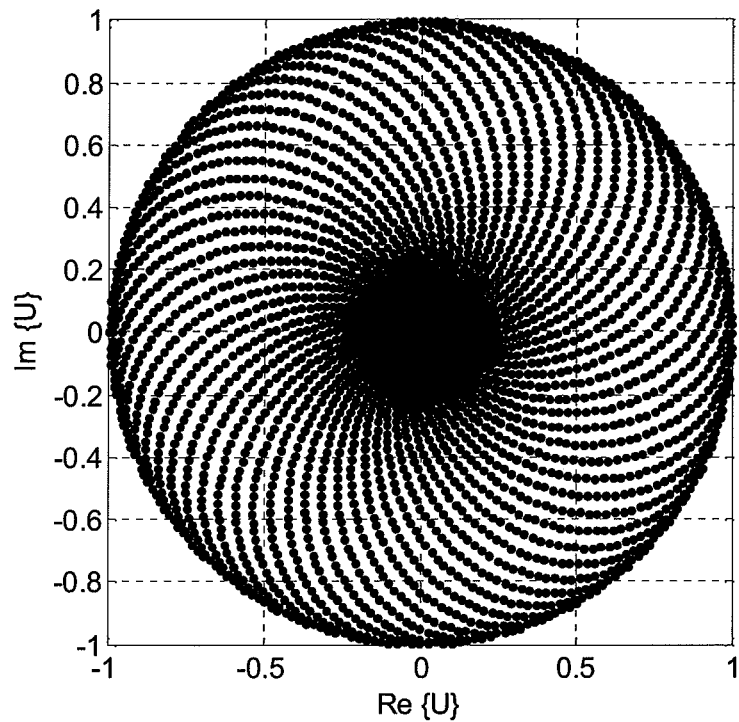
FIG. 11 shows the operation curve of the complex light modulator according to this invention, FIGS. 12a, b show the operation curves of a normal-only (a) and a lateral-only (b) displacement of a line grating, where (a) represents the prior art.

FIG. 11 shows the operation curve of the complex spatial light modulator according to this invention. Each point of this operation curve, from the centre to its outermost edge, corresponds with the ultimate point of a resultant phasor in the complex plane of the real and imaginary parts of complex amplitudes which can be realised with the C-SLM according to the present invention in this plane. Given a digital control, the density of points depends on the discretisation step width in the lateral and normal direction, which is 6 bit in each displacement direction in this example.

Figure 12:
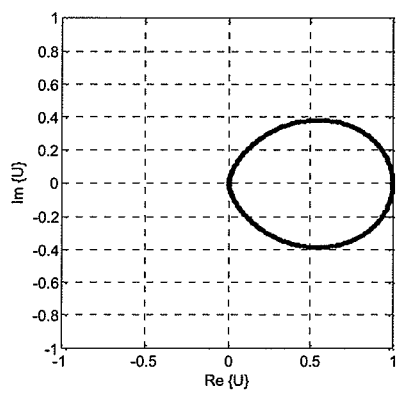
Figure 12:
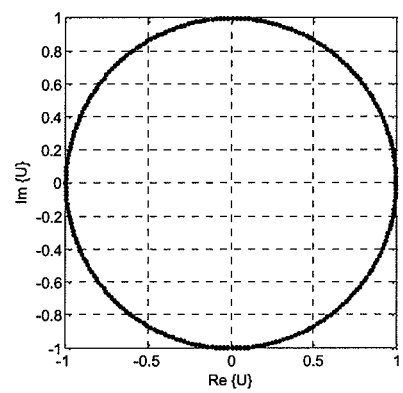

FIGS. 12a and 12b show exemplary operation curves for the modulation of wave fronts for a normal-only (a) and a lateral-only (b) displacement of a grating-based light modulator. The solution in FIG. 12a corresponds with the prior art of an amplitude-only modulation or an interrelated amplitude and phase modulation. The operation curve shown in FIG. 12b is generated if the line gratings in the light modulator are only displaced laterally, e.g. as for phase-only modulation.

Figure 13:
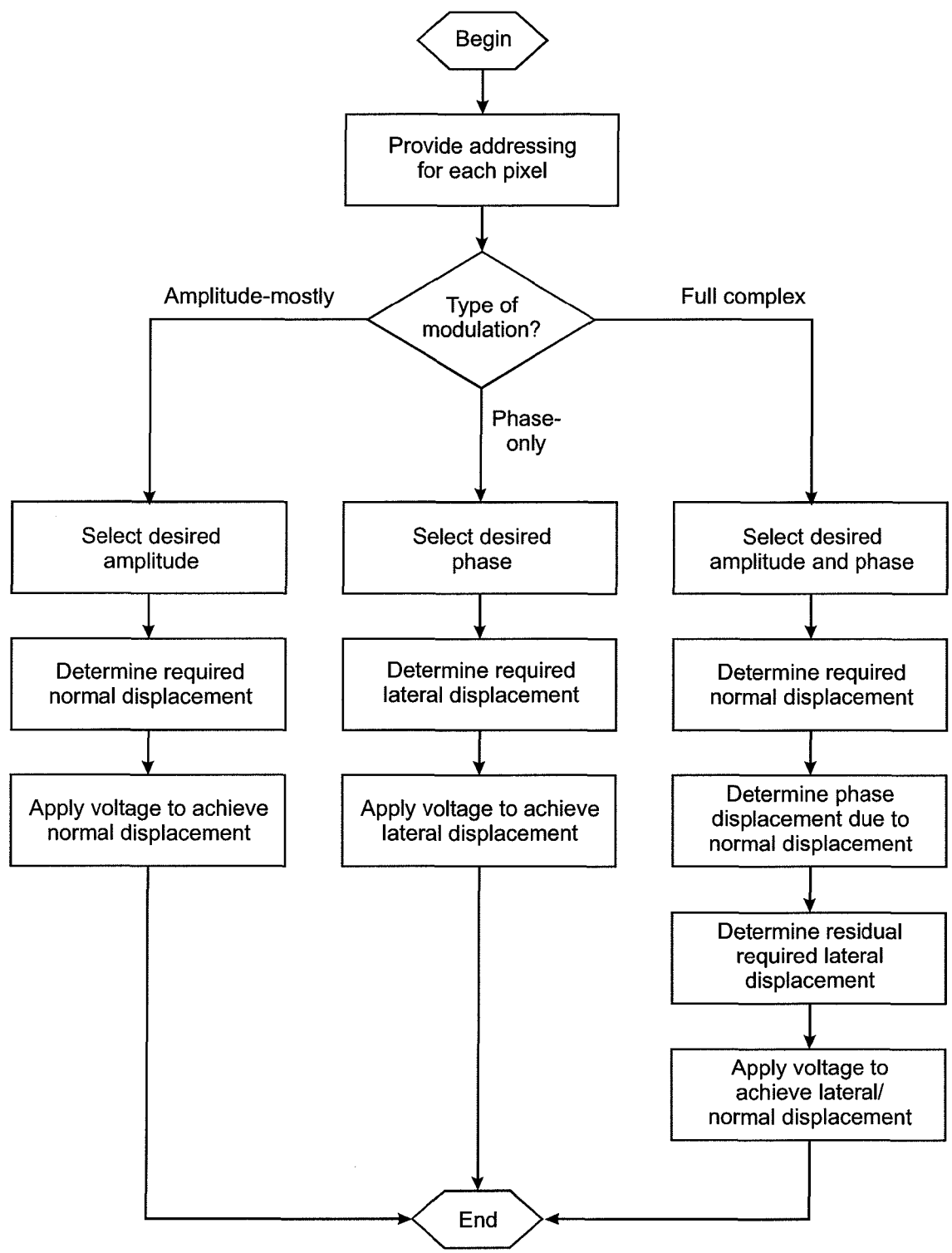
FIG. 13 is a flowchart for setting a pixel value in the complex light modulator for different types of modulation of incident wave fronts.

Different types of modulation of incident wave fields can be executed with the C-SLM according to this invention. This is shown in a flow chart in FIG. 13. According to the setting of the system controller, each modulator element in each pixel can be addressed either with a value for an amplitude modulation, phase modulation, or complex modulation. However, in the context of the present invention the usage in a complex mode is preferred. After having specified the type of modulation, either amplitude values or phase values or amplitude and phase values are selected for modulation according to the setting of the system controller, where said values can for example be stored in a look-up table. The required normal and/or lateral displacements Δt and Δx of the elements of the grating or ribbons in each pixel are determined by the system controller according to these values. These values can also be stored in the look-up table. The system controller generates control signals according to these displacements to control the actuators provided at each pixel such that the determined displacements of the elements of the grating or ribbons are realised. Coherent wave fronts which hit the thus set line gratings are given the desired phase and/or amplitude modulation.

According to a further embodiment of the present invention, the displacements Δx and Δt of the elements of the grating or ribbons depending on the preferred wavelengths λ and on the preferred type of modulation can also be stored in the look-up table.

According to another embodiment, in a spatial light modulator device which comprises at least one coherent light source, the complex SLM can be combined with at least one optical imaging system and with at least one filtering unit. The filtering unit serves to blank out undesired diffraction orders and to transmit the desired modulated diffraction order only.

The present invention provides a complex spatial light modulator (C-SLM) for continuous and mutually independent spatial modulation of both the phase and the amplitude of a wave front of a given wavelength of coherent light which hits the C-SLM. In addition to a full complex modulation, the C-SLM according to this invention can also be used for a phase-only modulation or for an amplitude-mostly modulation.

The C-SLM is manufactured with the help of micro-systems engineering technologies or MEMS manufacturing techniques, such as lithography, thin-film deposition and doping, etching, bonding, bulk micromachining and surface micromachining.

For a better understanding of the present invention, selected terms used in the theories of diffraction gratings will be explained briefly below.

In the general case of a line grating with the grating period p that is illuminated at an angle $\alpha_i$, the grating equation is $$\pm \sin\alpha_m - \sin\alpha_i = \frac{m\lambda}{p} \quad (1)$$

The diffraction angles $\alpha_m$ of the light with a wavelength $\lambda$ which is diffracted in the $m^{th}$ order are derived from that equation. The angles relate to the normal of respective carrier substrate. The grating equation applies to both reflection-type gratings (negative sign) and for transmission-type gratings (positive sign), if the light propagates coming from the left-hand side. According to their actual application, a distinction is made between reflection-type gratings and transmission-type gratings, and according to their design, a distinction is made between amplitude gratings and phase gratings. The orientation of the grating in space is defined by its grating vector. It runs in the direction of the gradient of the phase function. The grating period p of the arranged elements of the grating is the reciprocal value of the spatial frequency $\nu$ $$p(x, y) = \frac{1}{\nu(x, y)} \quad (2)$$

and the spatial frequency $\nu$ of a diffraction grating corresponds with the number of grating periods p per millimeter (grating line pairs per millimeter). Further characteristic properties of a diffraction grating are its duty factor and its aspect ratio. The duty factor is the quotient of width b of the element of the grating and grating period p, and the aspect ratio is the ratio of depth of the structure t and grating period p of the elements.

The scalar consideration of the diffraction effects provides a sufficient precision if the grating period p is by magnitudes higher than the wavelength of the incident light and only far-field effects of the diffraction phenomena are of interest. In spatial light modulators, the reconstruction properties in the far field are the decisive properties. According to the Fraunhofer approximation, the diffraction image in the far field corresponds with the Fourier transform of the field immediately after the diffractive structure. Diffraction efficiency $\eta$ and phase $\Psi$ of the resulting far field can be derived from this.

The diffraction efficiency $\eta$ and the phase $\Psi$ are developed below for the example of two-stage binary line gratings. A derivation can be found for example in Chang, Y. C. & Burge, J., Error analysis for CGH optical testing, *Optical Manufacturing and Testing III*, Stahl, H. P. (ed.), 1999, 3782, 358-366. According to the same principle, the diffraction efficiencies $\eta$ and the phases $\Psi$ of N-stage binary gratings or blazed, serrated gratings can be derived. It shall be noted that the equations (3) and (4) specified below thus apply to the special case of two-stage binary gratings, while the equations (5) to (8) are of general validity for the types of gratings mentioned.

The diffraction efficiency $\eta$ of a diffractive element is defined as the quotient of the intensity of the exiting wave and the intensity of the incident wave. If normalised to an entry intensity of one, the diffraction efficiencies can be derived for the individual orders. In two-stage binary line gratings, these are derived as follows for diffraction orders m other than zero $$\eta_{m\neq 0} = [A_0^2 + A_1^2 - 2A_0 A_1 \cos\phi] q_D^2 \sin c^2(m q_D). \quad (3)$$

where $A_0$, $A_1$ are the amplitude values of the exiting wave in the groove and on the grating element of the binary structure. They correspond with the amplitude reflection coefficients, which can be determined with the help of the Fresnel equations. The refractive index (real for dielectrics or complex for metals and semi-metals) of the reflecting surfaces must thus be known for the calculation of the amplitude reflection coefficients $A_0$, $A_1$. The phase $\phi$ represents the phase shift of the reflected wave between the areas of the elements of the gratings and groove areas. Given the groove depth t, the phase is $\phi = 2\pi/\lambda \cdot 2t$ in a reflection-type grating. $q_D$ is the duty factor of the grating structure. The phase of the resultant field is calculated from the arc tangent of the quotient of the imaginary part and the real part of the wave field in the far field. Accordingly, the phase $\Psi$ in the diffraction orders m other than zero is $$\Psi_{m\neq 0} = \arctan\left(\frac{A_1 \sin\varphi}{-A_0 + A_1 \cos\varphi}\right). \quad (4)$$

The analysis reveals that in a relative normal displacement of a line grating structure in relation to a base plate both the diffraction efficiency (amplitude squared) and the phase are affected, i.e. that the two quantities are interrelated and cannot be set independently of one another. The amplitude modulation of prior art grating-based SLM is based on the above described principle.

In order to be able to control the phase of the reflected wave field independently of the normal displacement of the grating, a further degree of freedom of the movement of the gratings is provided. A lateral displacement $\Delta x$ of the grating structure parallel to its grating vector results in a phase shift $\Phi$ $$\Phi = \frac{2\pi m}{p} \Delta x, \quad (5)$$

where p is the grating period and m is the diffraction order. The lateral displacement can also be understood as a phase offset which is added to the linear phase function of a single pixel.

The solution according to this invention combines the lateral and normal displacement of the grating, and thus the corresponding phase modulation and amplitude modulation of the diffracted light. The complex amplitude U of a pixel with the indices (k, l) of a pixel matrix can then be given as $$U_{k,l} = A_{k,l} \exp(i\phi_{k,l}) \quad (6)$$

where A is the real amplitude and $\phi$ is the phase value of the single pixel. The real amplitude is the square root of the normalised diffraction efficiency $$A_{k,l} = \sqrt{\frac{\eta_{k,l}}{\eta_{max}}} \quad (7)$$

where the efficiencies are calculated in accordance with equation (3) above. The phase value of a pixel is the sum of the phase contributions $\Psi$ and $\Phi$, whose amounts result from the Fourier transform of the grating structure:

$$\phi_{k,l} = \Psi_{k,l} + \Phi_{k,l}. \quad (8)$$

The invention claimed is:

1. A spatial light modulator with regularly arranged pixels, where each pixel comprises a modulation element in the form of a controllable reflecting line grating with a grating period p, wherein controlled by a system controller the position of the line grating is changed both normal to the plane of the light modulator and lateral in a plane that is parallel to the plane of the light modulator but at right angles to the structure of the line grating independently of one another, so as to realize an amplitude modulation of an incident wave field and a phase modulation of the incident wave field which is independent of said amplitude modulation.

2. The spatial light modulator according to claim 1, which comprises a base plate over which the line grating is suspended in a self-supporting manner in the plane of the light modulator or in a plane which is parallel to the latter, and wherein a minimum amount of the displacements in the lateral and in the normal direction is necessary for modifying the position of the line grating in the lateral and in the normal direction relative to the base plate.

3. The spatial light modulator according to claim 2, wherein the amplitude of the modulated wave front is set by modifying the distance between the line grating and the plane of the base plate.

4. The spatial light modulator according to claim 1, wherein by means of the controller, a desired amplitude modulation of the incident wave front is realizable by changing the position of the line grating normal to the plane of the light modulator, a phase modulation which is dependent of said desired amplitude modulation is determinable, and a desired phase modulation is realizable by changing the position of the line grating lateral in a place that is parallel to the plane of the light modulator by an additional phase modulation corresponding to the difference of the desired phase modulation and the amplitude modulation dependent phase modulation.

5. The spatial light modulator according to claim 1, wherein the amplitude of the exiting wave front is set by a rotary movement of individual ribbons around their axes by a variable angle value, which is representative of a phase shift in the normal direction.

6. The spatial light modulator according to claim 2, wherein the line grating comprises ribbons which are arranged in parallel and which are separated by a groove, where the groove is formed by the section of the base plate which is reached by the wave front.

7. The spatial light modulator according to claim 6, wherein the line grating and the base plate are made of or coated with a material that is reflective for the light to be modulated, and wherein the line grating and the base plate are reflective in a given identical spectral range.

8. The spatial light modulator according to claim 2, wherein the line grating comprises ribbons which are arranged in parallel and without gap next to each other, or wherein the line grating comprises ribbons which are arranged in parallel and without gap next to each other and wherein the base plate is made of or coated with a light absorbing material.

9. The spatial light modulator according to claim 8, wherein the line grating has N ribbons per grating period p, of which adjacent ribbons in the grating period p have a different distance in the normal direction, where N>2.

10. The spatial light modulator according to claim 2, wherein actuator elements for modifying the position of the line gratings relative to the base plate are provided whose effect is based on the principles of electrostatics, electromagnetism, or on the piezoelectric effect, and wherein the actuator elements are controlled by control signals provided by the system controller.

11. The spatial light modulator according to claim 9, wherein the lateral displacement of the ribbons is effected by comb-shaped actuator elements.

12. The spatial light modulator according to claim 9, wherein the changes in the position of the line gratings relative to the base plate which are caused by the actuator elements cover the entire range of the amplitude and phase values between individual pixels.

13. The spatial light modulator according to claim 1, wherein the amplitude and phase modulation which is achieved by the change in the position of the line grating in the plane of the light modulator exhibits a resultant amplitude and phase distribution or wherein the amplitude and phase modulation which is achieved by the change in the position of the line grating in the plane of the light modulator exhibits a resultant amplitude and phase distribution and wherein the resultant amplitude and phase distribution is binary, n-stage binary or serrated for a switching state of the light modulator.

14. A light modulator device with a complex-valued spatial light modulator according to claim 1 and with at least one light source, an optical imaging system and a filtering unit, where the pixels of the light modulator are optionally operated in an amplitude-modulating mode, in a phase-modulating mode or in a complex mode.

15. A method of modulating a wave field which is incident on a spatial light modulator with regularly arranged reflective pixels, where each pixel comprises a reflective modulation element in the form of a controllable line grating with a grating period p, wherein a system controller controls a change in the position of the line grating both normal to the plane of the light modulator and lateral in a plane that is parallel to the plane of the light modulator but at right angles to the structure of the line grating independently of one another such as to realize a desired amplitude modulation of the incident wave field and a desired phase modulation of the incident wave field which is independent of the amplitude modulation, comprising the following steps:

obtaining the desired amplitude modulation by changing the position of the line grating normal to the plane of the light controller determining the phase modulation induced by said amplitude modulation realizing the desired phase modulation by changing the position of the line grating lateral in a place that is parallel to the plane of the light modulator by a value corresponding to the difference of the desired phase modulation and the amplitude modulation induced phase modulation.

16. The method according to claim 15, wherein the value of the additional phase modulation is determined in a model calculation which is executed by a computing unit which is integrated into the system controller or wherein the value of the additional phase modulation is determined in a calibration measurement whose values are stored in a storage medium and which are retrieved by a computing unit.

17. The method according to claim 15, wherein the system controller controls actuator elements which execute the displacements of the line grating through movable connection means.

18. The method according to claim 15, wherein the system controller realises a staged phase profile by moving ribbons in the normal direction in that N ribbons per grating period p are moved relative to each other offset at a distance $\Delta t/N$ in a line grating.

19. The method according to claim 15, wherein the system controller addresses all line gratings simultaneously to modulate the incident wave field or wherein the system controller addresses selected line gratings in order to realise different spatial modulations of the incident wave field in individual areas of the modulator.

* * * * *